US 9,461,877 B1

(12) United States Patent
Nadeau et al.

(10) Patent No.: US 9,461,877 B1
(45) Date of Patent: Oct. 4, 2016

(54) AGGREGATING NETWORK RESOURCE ALLOCATION INFORMATION AND NETWORK RESOURCE CONFIGURATION INFORMATION

(71) Applicant: Juniper Networks, Inc., Sunnyvale, CA (US)

(72) Inventors: Thomas D. Nadeau, Hampton, NH (US); Nitin Bahadur, Santa Clara, CA (US); Kenneth E. Gray, Myersville, MD (US)

(73) Assignee: Juniper Networks, Inc., Sunnyvale, CA (US)

( * ) Notice: Subject to any disclaimer, the term of this patent is extended or adjusted under 35 U.S.C. 154(b) by 185 days.

(21) Appl. No.: 14/037,653

(22) Filed: Sep. 26, 2013

(51) Int. Cl.
*H04L 12/24* (2006.01)
*H04Q 3/00* (2006.01)

(52) U.S. Cl.
CPC ......... *H04L 41/042* (2013.01); *H04L 41/0853* (2013.01); *H04L 41/0896* (2013.01); *H04L 41/12* (2013.01); *H04Q 3/0062* (2013.01)

(58) Field of Classification Search
CPC ............. H04L 41/042; H04L 41/0896; H04L 41/0853; H04L 41/12; H04Q 3/0062
See application file for complete search history.

(56) References Cited

U.S. PATENT DOCUMENTS

| | | | |
|---|---|---|---|
| 8,995,285 B2 * | 3/2015 | Bajpay et al. ................ | 370/244 |
| 2003/0189919 A1 * | 10/2003 | Gupta et al. .................. | 370/351 |
| 2012/0058757 A1 * | 3/2012 | Cancer Abreu et al. ..... | 455/423 |
| 2013/0326059 A1 * | 12/2013 | Gourlay .................. | H04L 43/04 |
| | | | 709/224 |
| 2015/0003283 A1 * | 1/2015 | Previdi et al. ................ | 370/254 |

OTHER PUBLICATIONS

Amante et al. (Internet-Draft, "Topology API Use Cases", draft-amante-i2rs-topology-use-cases-00, Feb. 12, 2013).*
Medved et al. "An Information Model for Network Topologies" draft-medved-i2rs-topology-im-00.txt, Network Working Group, Internet-Draft, Jul. 15, 2013, 16 pgs.
U.S. Appl. No. 13/110,987, filed May 19, 2011 entitled "Dynamically Generating Application-Layer Traffic Optimization Protocol Maps".
U.S. Appl. No. 13/324,861, filed Dec. 13, 2011 entitled "Path Computation Element Communication Protocol (PCEP) Extensions for Stateful Label Switched Path Management".
Vasseur et al. "Path Computation Element (PCE) Communication Protocol (PCEP)" Network Working Group, RFC 5440, Mar. 2009, 87 pgs.
Atlas et al. "Interface to the Routing System Framework" draft-ward-irs-framework-00, Network Working Group, Internet-Draft, Jul. 30, 2012, 22 pgs.
U.S. Appl. No. 13/842,453, filed Mar. 15, 2013 entitled Aggregation Network With Centralized Control.

* cited by examiner

*Primary Examiner* — Jutai Kao
*Assistant Examiner* — Moo Ryong Jeong
(74) *Attorney, Agent, or Firm* — Shumaker & Sieffert, P.A.

(57) ABSTRACT

A network device is described that receives information from separate database systems including a physical network inventory system that stores first topology data specifying resources and links within a network and a traffic engineering system that stores second topology data specifying the resources and links that are deployed within the network and data specifying traffic engineered paths configured to forward network traffic through the network. The network device aggregates the received information into a topology resource management system that stores third topology data specifying at least a current role of each of the resources and links. The network device determines a modification to at least one of the traffic engineered paths based on the third topology data, including an adjustment to the current role of at least one of the resources to change the forwarding of the network traffic. The network device outputs provisioning information based on the modification.

21 Claims, 6 Drawing Sheets

AGGREGATING NETWORK RESOURCE ALLOCATION INFORMATION AND NETWORK RESOURCE CONFIGURATION INFORMATION

TECHNICAL FIELD

This disclosure relates to computer networks, and more particularly, to network management systems.

BACKGROUND

A computer network is composed of a set of nodes and a set of links that connect one node to another. For instance, the nodes of a computer network may represent a set of computing resources (e.g., routers, servers, etc.) that exchange information with one another and the links of the computer network may represent the cables or transmission paths that interconnect each of the computing resources to one another. When a first node in the network sends a message to a second node in the network, the message may pass through many links and many nodes. The links and nodes that a message passes through while traveling from a first node to a second node is referred to as a path of the message.

An enterprise may deploy a large scale computer network that has many nodes and many links. The enterprise may include a procurement division and a network engineering division which are separate and distinct entities of the enterprise that operate separate and distinct systems to help the enterprise manage a large scale network. The procurement division of the enterprise may maintain an inventory database that specifies the actively deployed computing resources, the dormant, and/or the inactive (e.g., deployed, but not yet activated) physical computing resources of the network and uses the information in the inventory database to ensure the network has sufficient resources to meet existing and future demands of the network. The network engineering division of the enterprise may maintain a traffic engineering database that specifies the actively deployed computing resources and the paths that are configured to forward network traffic through the actively deployed computing resources in the network. The network engineering division may rely on the information in the traffic engineering database to change the paths for the existing and future data flow requirements of the network. These separate systems and databases, being managed by separate and distinct entities, may be irreconcilable and/or include conflicting data associated with the network. By relying on separate databases that at times may represent a different view of the network, the two divisions may not always follow consistent approaches to helping the enterprise manage the network.

SUMMARY

In general, techniques are described for aggregating information maintained by a plurality of separate database systems associated with a network to improve traffic engineering algorithms and optimization of network paths. For example, the techniques may be used by a network device to aggregate otherwise irreconcilable data, being maintained at separate databases which are each associated with two different divisions of an enterprise, and based on the aggregated data, determine a modification to one or more traffic engineered paths of the network based on the aggregated data.

For example, a computer network of an enterprise may have a large quantity of computing resources. A procurement division of the enterprise may use a physical network inventory system that maintains an inventory database of the computing resources of the network. A network engineering division of the enterprise (e.g., a separate and distinct division of the enterprise from the procurement division) may use a traffic engineering system (that is different from the physical network inventory system of the procurement division) that maintains a traffic engineering database of the network. Each of the databases maintained by these two systems may be irreconcilable and/or inconsistent. In other words, the data specified by one database may not be consistent for a particular time with the data maintain by the other and/or each database may store additional information about the state of the network that the other database cannot store or has yet to obtain. Because each system may be acting on different and sometimes inconsistent sets of data associated with the network, each system may not always make the best decisions for managing the network. For instance, the traffic engineering system may not configure the most optimal path for network traffic through the network if the traffic engineering system cannot detect a dormant, yet available, computing resource that the procurement division recently added to the network and that are specified in the inventory database. In accordance with the techniques of this disclosure, a network device configured as a topology resource management system can obtain portions of the information stored at each of the inventory database and the traffic engineering database and aggregate the portions of information into a single resource database. From the single resource database, the network device can execute network path optimization algorithms and improve traffic flow and resource management through the network. The resource database specifies data that represents a highly accurate and consistent view of the network, including the actively deployed and inactively deployed, as well as dormant (e.g., disabled, etc.) computing resources of the network, the deployed and/or dormant physical links, active and inactive logical links of the network, and the multi-layer relationships between the various computing resources and links.

In one example, a method includes receiving, at a network device, information from a plurality of separate database systems, the plurality of separate database systems including a physical network inventory system and a traffic engineering system, wherein the physical network inventory system stores first topology data specifying resources and links within a network and wherein the traffic engineering system stores second topology data specifying the resources and links that are deployed within the network and data specifying traffic engineered paths configured to forward network traffic through the network. The method further includes aggregating, by the network device, the received information into a topology resource management system, wherein the topology resource management system stores third topology data specifying at least a current role of each of the resources and links within the network. The method further includes determining, by the network device, a modification to at least one of the traffic engineered paths based on the third topology data, wherein the modification includes an adjustment to the current role of at least one of the resources and links within the network to change the forwarding of the network traffic through the network. The method further includes outputting, by the network device, for transmission to the at least one of resources within the network, provisioning information for adjusting the current role of the at least one of the resources based on the modification.

In another example, a device includes an interface configured to: receive information from a plurality of separate database systems, the plurality of separate database systems including a physical network inventory system and a traffic engineering system, wherein the physical network inventory system stores first topology data specifying resources and links within a network and wherein the traffic engineering system stores second topology data specifying the resources and links that are deployed within the network and data specifying traffic engineered paths configured to forward network traffic through the network. The device further includes a memory comprising third topology data specifying at least a current role of each of the resources and links within the network. The device further includes a control unit comprising: an aggregation module configured to aggregate the received information into the third topology data, a management daemon module configured to determine a modification to at least one of the traffic engineered paths based on the third topology data, wherein the modification includes an adjustment to the current role of at least one of the resources and links within the network to change the forwarding of the network traffic through the network, and a provisioning module configured to generate the provisioning information for adjusting the current role of the at least one of the resources based on the modification determined by the management daemon module, wherein the interface is configured to output the provisioning information for adjusting the current roles of the at least one of the resources within the network.

In another example, a computer-readable storage medium includes instructions that, when executed, cause a processor to receive information from a plurality of separate database systems, the plurality of separate database systems including a physical network inventory system and a traffic engineering system, wherein the physical network inventory system stores first topology data specifying resources and links within a network and wherein the traffic engineering system stores second topology data specifying the resources and links that are deployed within the network and data specifying traffic engineered paths configured to forward network traffic through the network. The computer-readable storage medium includes additional instructions that, when executed, cause the processor to aggregate the received information into a topology resource management system, wherein the topology resource management system stores third topology data specifying at least a current role of each of the resources and links within the network. The computer-readable storage medium includes additional instructions that, when executed, cause the processor to determine a modification to at least one of the traffic engineered paths based on the third topology data, wherein the modification includes an adjustment to the current role of at least one of the resources and links within the network to change the forwarding of the network traffic through the network. The computer-readable storage medium includes additional instructions that, when executed, cause the processor to output, for transmission to the at least one of resources within the network, provisioning information for adjusting the current role of the at least one of the resources based on the modification.

The details of one or more examples are set forth in the accompanying drawings and the description below. Other features, objects, and advantages will be apparent from the description and drawings, and from the claims.

DETAILED DESCRIPTION

Figure 1:
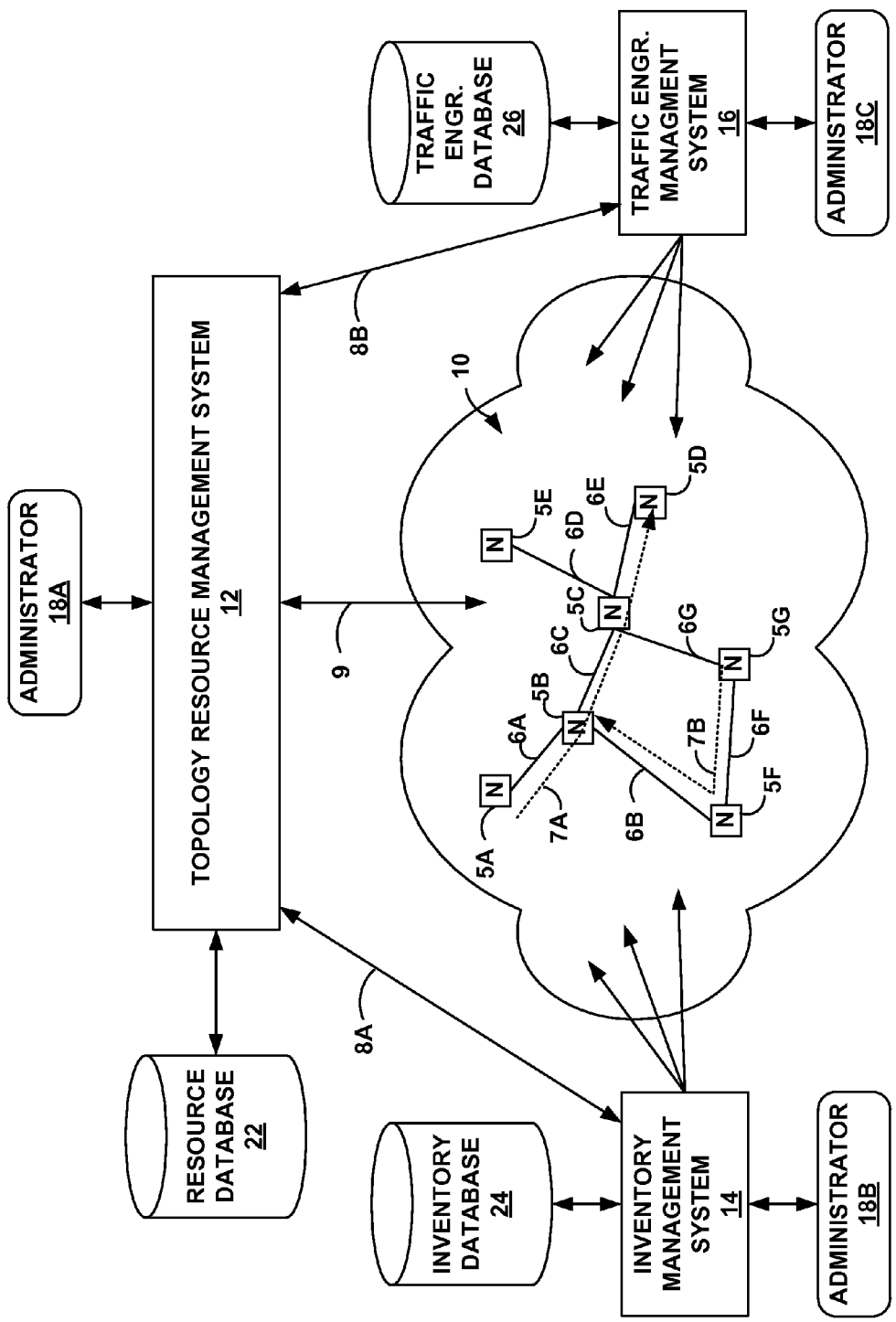
FIG. 1 is a block diagram illustrating an example network that is configurable with a topology resource management system according to the techniques of this disclosure.

To improve performance of a network, some network engineering management systems may perform various network engineering techniques for, among other things, provisioning computing resources of a network (e.g., network elements, links, etc.), monitoring and/or modifying behavior or status of the computing resources of a network, performing analysis of traffic flows through the network, as well as for re-provisioning the computing resources of the network. By performing network engineering techniques such as these, some network engineering management systems may configure the various computing resources to modify paths of traffic through a network and/or to cause the computing resources to operate more efficiently by using a greater percentage of available computing resources in the network, rather than a select few. In addition, these network engineering techniques may modify flow of traffic through traffic paths by compensating for environmental changes, operational changes, and/or other adjustments to the network that change the status and/or behavior of the computing resources and computing resource usage patterns (e.g., bandwidth utilization and demand).

In order to perform network engineering techniques, such as those described above, some network engineering management systems may rely on both physical information about the resources and links of a network as well as "live" statistical and/or post-processing analysis information associated with the current traffic flow through the network. In some instances, the physical information relied upon by network engineering management systems may include data which is gathered in "real-time" by these network engineering management systems through communications with the currently active computing resources of the network but may not include information about inactive or soon-to-be activated computing resources, and may not include information about dormant computing resources that have yet to be enabled or to be activated and deployed in the future. In other words, some network engineering management systems do not have access to a complete "record of truth" database (typically maintained by a procurement or purchasing department of an enterprise) that includes information pertaining to all the computing resources of a network, whether active and operational or inactive and standing by waiting to be activated, or dormant (e.g., physically disabled and disconnected from network 10) thus preventing a network engineering management system from recommending that a computing resource be activated to improve a new or existing traffic path through the network. Further complicating the tasks of network engineering management systems for improving traffic flow through a network are multi-layer interactions which may or may not be considered, or if they are considered, are considered in fractured or fragmented ways. In other words, some network engineering managements systems cannot fully improve and/or "network engineer" traffic paths through a network since these systems cannot reconcile physical network layer information (e.g., layer one, hereafter referred to as "L1", or layer two, hereafter referred to as "L2", topology information) with higher layer information (e.g., layer three, hereafter referred to as "L3" through layer seven, hereafter referred to as "L7", topology information.

In general, techniques are described for aggregating information maintained by a plurality of separate database systems associated with a network to improve traffic engineering algorithms and improvement of network paths. For example, the techniques may be used by a network device to aggregate otherwise irreconcilable data, being maintained at separate databases which are each associated with two different divisions of an enterprise, and based on the aggregated data, determine a modification to one or more traffic engineered paths of the network based on the aggregated data.

FIG. 1 is a block diagram illustrating example network 10 that is configurable with topology resource management system 12 according to the techniques of this disclosure. Computing resources 5A-5G of network 10 (collectively, "resources 5") include any quantity of interconnected nodes of network 10 that exchange resources and information via communication links 6A-6G (collectively, "links 6") to form a communication topology. Even though seven computing resources 5 are illustrated in FIG. 1, any number of computing resources 5 may be included in network 10. Computing resources 5 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. Network 10 supports the exchange of protocol data units (PDUs) for transmitting data among computing resources 5 and management systems 12, 14, and 16. Such PDUs may comprise, for example, Internet Protocol (IP) packets Ethernet datagrams, and Asynchronous Transfer Mode (ATM) cells. Communication links 6 interconnecting computing resources 5 may be physical links (e.g., optical, copper, and the like) or wireless.

Network 10 may be managed by a plurality of management systems 12, 14, and 16. Each of management systems 12, 14, and 16 may communicate with computing resources 5 of network 10 to perform various network management functions, such as adding, deleting, activating, provisioning, re-provisioning, or otherwise configuring computing resources 5 for network communication over links 6.

Management systems 12, 14, and 16 are described below in greater detail. FIG. 1 illustrates that management system 16 operates to manage network 10 based on information received from each of management systems 12 and 14. FIG. 1 further illustrates that management systems 12 and 14 are each independently manage different aspects of network 10 without always necessarily sharing particular information directly between each of the two systems.

Although illustrated as separate physical network devices, management systems 12, 14, and 16, may represent two or more components or virtual machines that operate within the same network or computing device. For example, each of management systems 12, 14, and 16 may operate as individual components of a larger enterprise network server device. Management systems 12, 14, and 16 may each be virtual machines that execute on a single network or computing device (e.g., a server) with each of management systems 12, 14, and 16 operating as separate and distinct components or machines of the single network or computing device.

For instance, network 10 may be associated with an enterprise (e.g., an entity, business, organization, etc.) that has multiple divisions or departments. A procurement division of the enterprise may procure and manage the physical installation of computing resources 5 and links 6 within network 10 on behalf of the enterprise. The procurement division may physically install computing resources 5 at various geographic locations and wire and/or wirelessly create the physical links 6 that interconnect computing resources 5. After the procurement division physically establishes network 10, the procurement division may or may not alert a network engineering division of the enterprise of the changes made to network 10. Once the network engineering division becomes aware of the additional resources 5 of links 6 of network 10, the network engineering division may provision computing resources 5 for performing functions of network 10 and may further traffic engineer or create paths of network traffic 7A-7B (collectively, "paths 7") through links 6 of network 10.

Various other departments or divisions of the enterprise associated with network 10 may perform various other types of network management related tasks. In any event, each of these separate and different divisions or departments of the enterprise may use separate systems and databases to manage different aspects of network 10 and may not always communicate the changes made to network 10 by one division to the other divisions. As a result of sporadic or sometimes non-existent communication between divisions or departments of the enterprise, the data stored by each of the plurality of different databases and systems that are used by different divisions to manage network 10 may be irreconcilable and/or inconsistent from one department or division to another.

For example, the procurement division of the enterprise may use inventory management system (IMS) 14 to provide inventory management services for network 10. IMS 14 represents a physical network inventory system that stores topology data of the network 10 at inventory database 24. Inventory database 24 stores data that specifies physical network layer (e.g., L1 according to the Open Source Interconnection standard) topology data of computing resources 5 of network 10 and other information associated with the physical characteristics of each of computing resources 5. For instance, inventory database 24 may include information about the physical location and the status of each individual computing resource 5 of network 10 (e.g., whether a resource is "active" by being actively deployed and able to be re-provisioned, "inactive" by being inactively deployed and able to be provisioned, and "dormant" by being physically disconnected and unable to be activated or provisioned without first deploying the resource) as well as a record of which of physical links 6 interconnect which two computing resources.

The network engineering division of the enterprise may use traffic engineering management system (TEMS) 16 to provide traffic engineering services for network 10. TEMS 16 maintains traffic engineering database 26 associated with network 10 which stores data that specifies the deployed computing resources 5 within network 10 and may further specify traffic engineered (e.g., logical) paths 7 that are configured to forward network traffic through network 10 between deployed computing resources 5. For example, traffic engineering database 26 may include "real-time" information network layer (e.g., L3) topology data of computing resources 4 of network 10 and/or information associated with layer topology data of other layers of network 10 (e.g., transport layer four, hereafter referred to as "L4", session layer five, hereafter referred to as "L5", etc.) that describe current logical relationships between various computing resources 5 and/or logical communication paths 7 and traffic schemes that exist in network 10 for a particular (e.g., current) time. TEMS 16 may update the information stored at database 26 with regular frequency to provide a "real-time" view of the current L3 and above network topology of network 10.

IMS 14 may include a network scan module that is configurable to cause IMS 14 to periodically (e.g., daily, weekly, monthly, etc.) update inventory database 24 to reflect changes made to the physical network configuration of network 10 (e.g., as computing resources 5 and links 6 are added to and/or deleted from network 10) by IMS 14 and the procurement division of the enterprise. TEMS 16 may also include a network scan module that is configurable to cause TEMS 16 to periodically update traffic engineering database 26, irrespective of when IMS 14 updates database 24, to reflect traffic engineering changes made to network 10 (e.g., as paths 7 are modified, computing resources 5 are provisioned, etc.) by TEMS 16 and the network engineering division.

IMS 14 and TEMS 16 are separate and distinct network management systems and may each be associated with separate and distinct departments or divisions of the enterprise associated with network 10. Because IMS 14 and TEMS 16 are separate and distinct network management systems, and each of IMS 14 and TEMS 16 may use separate and independent network scan modules, the network scan module of IMS 14 may cause IMS 14 to update database 24 at a different time than when the network scan module of TEMS 16 causes TEMS 16 to update database 26. As a result of being part of independent network management systems, and updating each of databases 24 and 26 at different times, databases 24 and 26 may each store data that reflects the current state of network 10 at different times. In addition, database 24 may store data that reflects the current state of network 10 based on information known only to the procurement division of the enterprise and irrespective of information known only to the network engineering division of the enterprise.

Likewise, administrator 18B may cause IMS 14 to update database 24 to store data that reflects the current state of network 10 based on information known only to administrator 18B of the network engineering division of the enterprise and irrespective of information known only to administrator 18C of the procurement division of the enterprise. Administrator 18B may cause IMS 14 to update database 24 to store data that reflects the current state of network 10 based on information known only to administrator 18B of the network engineering division of the enterprise and irrespective of information known only to administrator 18C of the procurement division of the enterprise.

As a result of independent updates being made by administrators 18B and 18C and separate network scan modules of IMS 14 and TEMS 16 to databases 24 and 26 respectively, the data stored at one of databases 24 and 26 may be irreconcilable with the data stored at the other one of databases 24 and 26. In other words, the data specified by one of databases 24 and 26 may be inconsistent with the data maintained by the other one of databases 24 and 26 and/or each of databases 24 and 26 may store particular information that the other one of databases 24 and 26 cannot store, or has yet to obtain. For example, inventory database 24 may store L2 topology information including information related to a newly added one of resources 5 and information associated with a newly added one of physical links 6, and network engineering database 26 may store L3 topology information specifying paths 7 of already active resourced 5 and links 6 without factoring in the newly added resources 5 of links 6.

Because each of systems 14 and 16 may be acting on different and sometimes inconsistent sets of data associated with network 10, each of systems 14 and 16 may not always make the best decisions for managing the network. For instance, TEMS 16 may not configure the most optimal path 7 of network traffic through network 10 utilizing one or more of resources 5 and links 6 if TEMS cannot detect an inactive (e.g., un-provisioned), yet available, and/or dormant (e.g., disconnected or disabled) one of computing resource 5 and/or links 6 that the procurement division recently added to network 10 and is specified by IMS 14 in inventory database 24.

Topology resource management system (TRMS) 12 of network 10 represents a network device or network system of network 10 that can obtain portions of the information stored at each of inventory database 24 and traffic engineering database 26, and aggregate the portions of information into a single database, illustrated as resource database 22. For example, TRMS 12 may cause IMS 14 to perform a data export of at least a portion of the information stored at inventory database 24 over link 8A. Administrator 18A may interact with TRMS 12 to cause TRMS 12 to update resource database 22 and/or perform network engineering and/or path optimization operations based on the data specified by resource database 22. TRMS 12 may be a software-defined network (SDN) controller, for example.

TRMS 12 may receive the exported information at a network interface of TRMS 12 which is coupled to link 8A. Similarly, TRMS 12 may cause TEMS 16 to perform a data export of at least a portion of the information stored at traffic engineering database 26 over link 8B. TRMS 12 may receive the exported information from TEMS 16 at a network interface of TRMS 12 which is coupled to link 8B. TRMS 12 may aggregate the information received from IMS 14 and TEMS 16 and correlate the information into a single, hierarchal topology resource database 22.

Based on the aggregated data stored at resource database 22, TRMS 12 can execute improved network engineering tasks (e.g., network path optimization algorithms, improve traffic flow, etc.) over the network engineering tasks that TEMS 12 can perform due to the fact that TRMS 12 has a wider view of the current state of network 10 and information about the available active, inactive, and dormant resources 5 and links 6 rather than just information associated with the active resources 5 and links 6 maintained at traffic engineering database 26. In addition, based on the aggregated data stored at resource database 22, TRMS 12 can execute improved procurement tasks (e.g., inventory resource management, procurement forecasting, etc.) over the procurement tasks that IMS 14 can perform due to the fact that TRMS 12 has a wider view of paths 7 (e.g., the current usage of the available active resources 5 and links 6 of network 10) than the narrower views of network 10 maintained database 24 that may simply indicate a quantity of active, inactive, and/or dormant resources 5 and links 6.

By virtue of having access to the data stored at inventory database 24 and traffic engineering database 26, TRMS 12 may maintain a resource database 22 that includes topology data that specifies a more complete and accurate picture of the current state of network 10 and the status of resources 5 and links 6. In other words, through access to resource database 22, TRMS 22 has access to information that specifies the complete topology of network 10 (e.g., L2 through L7), rather than information that specifies only a partial topology of network 10 (e.g., the L1, L2, and/or L3 topology information at database 24 or the L3 through L7 topology information at database 26).

TRMS 12 may receive information from a plurality of separate database systems at various network interfaces communicating with IMS 14 and TEMS 16, including information exported by IMS 14 and TEMS 16 from inventory database 24 and traffic engineering database 36 respectively. An aggregation module of TRMS 12 may aggregate the received information into topology data stored at resource database 26. The data of resource database 26 specifies a current role of each of resources 5 within network 10 in relation to the various topology layers of network 10. For example, resource database 26 may include information that indicates whether each of resources 5 is actively deployed (e.g., powered and/or provisioned on the network), inactive (e.g., powered and able to be provisioned on the network), or dormant (e.g., unpowered, standing by and physically unconnected from network 10, and/or un-provisioned). A controller module of TRMS 12 may determine a modification to at least one of the traffic engineered paths 7 based on the aggregated topology data stored at resource database 26. In some examples, a modification may include an adjustment to the current role of at least one of resources 5 within network 10 to modify (e.g., improve) the forwarding of network traffic through network 10.

In some examples, the modification to the at least one of the traffic engineered paths 7 based on the topology data stored at resource database 22 comprises an addition of the at least one of the resources 5 within the network 10 to the at least one of the traffic engineered paths 7 to change the forwarding of the network traffic through network 10. For instance, the modification may include enabling and deploying one of the resources 5 of network 10 that had been dormant, and including the previously dormant one of resources 5 or links 6 in one of paths 7.

In some examples, the modification to the at least one of the traffic engineered paths 7 based on the topology data stored at resource database 22 comprises the removal of the at least one of the resources 5 within network 10 from the at least one of the traffic engineered paths 7 to change the forwarding of the network traffic through network 10. For instance, the modification may include disabling and deactivating (e.g., un-deploying) one of the resources 5 of network 10 that had been actively deployed, and removing resources 5 or link 6 from being part of one of paths 7.

In some examples, the modification to the at least one of the traffic engineered paths comprises determining the modification based on a current role of the at least one of the resources specified in the first and second topology data as being an actively deployed or inactively deployed resource of the network. For instance, the modification may include provisioning and actively deploying one of the resources 5 of network 10 that had been inactively deployed previously to include the previously inactively deployed one of resources 5 or links 6 in one of paths 7.

The controller module of TRMS 12 may send instructions to a provisioning module of TRMS 12 to cause TRMS to output, for transmission to at least one of the physical network inventory system and the traffic engineering system, provisioning information base on the modification to cause the adjustment to the current role of the at least one of resources 5. By having access to the aggregated information stored at resource database 22, TRMS 12 can specify data representing a highly accurate and up-to-date view of network 10, including physical information associated with resources 5, links 6, and the multi-layer logical relationships that exist between resources 5 and links 6. With access to the aggregated information, TRMS 12 may output indications (e.g., at a GUI accessed by a network engineering division) of improved modifications to paths 7 to change, load-balance, or otherwise modify the traffic flow through network 10. In addition, TRMS 12 may output indications (e.g., at a GUI access by a procurement division) of equipment to purchase for upgrading, installing, or otherwise altering the quantity and/or makeup of resources 5 of network 10.

Figure 2:
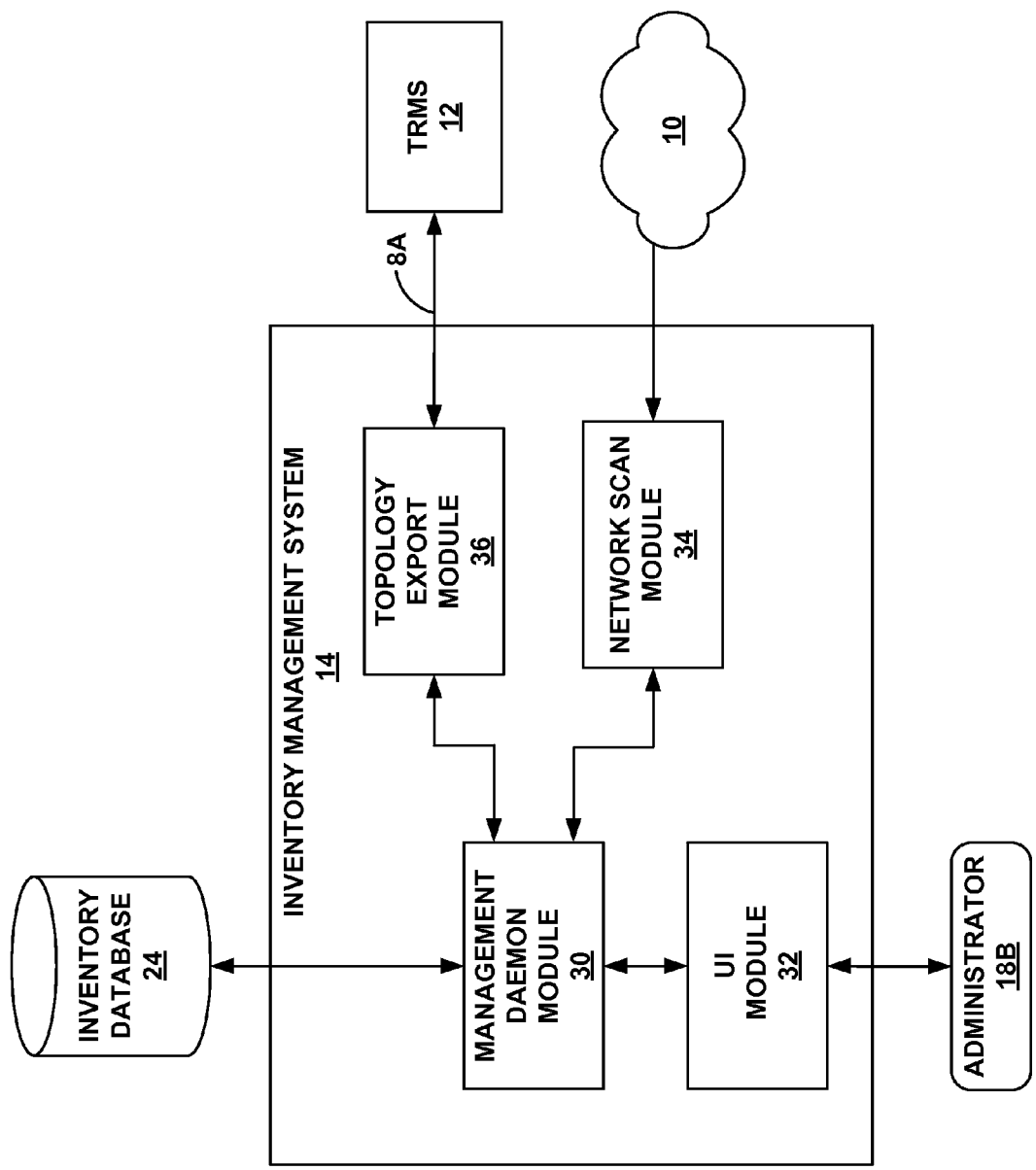
FIG. 2 is a block diagram illustrating components of an example physical network inventory management system that operates in accordance with aspects of this disclosure.

FIG. 2 is a block diagram illustrating components of IMS 14 that operates in accordance with aspects of this disclosure. FIG. 2 is described below within the context of IMS 14, TRMS 12, and network 10 of FIG. 1. FIG. 2 illustrates only one particular example of IMS 14 and many other examples of IMS 14 may be used in other instances. IMS 14 may be any general-purpose network and/or computing device, or component thereof, coupled to network 10. For instance, IMS 14 may be a server, laptop computer, workstation, or sub-component of a server, laptop computer, or workstation.

In the example of FIG. 2, IMS 14 contains management daemon module 30, topology export module 36, network scan module 34, and UI module 32 which are each executing within an operating environment provided by a control unit of IMS 14. For instance, IMS 14 may include a control unit that provides the operating environment of IMS 14 for executing modules 30, 32, 34, and 36.

The term control unit, as used throughout this disclosure, may refer to any computing element that represents any combination of hardware, software, and/or firmware for implementing the functionality attributed to a network management system, such as IMS 14, and its constituent modules and elements. When a control unit includes software or firmware, the control unit further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components.

Modules 30, 32, 34, and 36 may perform operations described herein using software, hardware, firmware, or a mixture of hardware, software, and firmware residing in and executing at IMS 14. For example, a control unit of IMS 14 may execute modules 30, 32, 34, and 36 as program code with one or more processors. In some examples, IMS 14 may execute modules 30, 32, 34, and 36 as one or more virtual machines executing on underlying hardware. Modules 30, 32, 34, and 36 may operate independently or collectively to perform a process or service for IMS 14. FIG. 2 illustrates various communication paths for transmitting data and commands between modules 30, 32, 34, and 36 that facilitate collective operations performed on behalf of IMS 14. For instance, management daemon module 30 shares a communication path between each of the other modules of IMS 14.

Network scan module 34 may periodically poll resources 5 in network 10 to obtain current information about the locations of resources 5 in network 10. For example, network scan module 34 may issue a request to each of resources 5 requesting current configuration information. A management daemon module (MGD) or other software agent executing on resources 5 of network 10 may respond by returning the requested information. Network scan module 34 may poll resources 5 one at a time, or may scan multiple resources 5 in parallel threads. In another embodiment, network scan module 34 may not poll network 10, but may instead receive event-driven notifications from resources 5 indicating changes in inventory elements.

UI module 32 presents a user interface (e.g., a command line interface, a graphical user interface, a webpage interface, etc.) by which administrator 18B or other users of the procurement division of the enterprise interact with IMS 14. Administrator 18B may, for example, interact with UI module 32 to request, customize, and/or update information stored at inventory database 24 pertaining to the physical network topology of network 10. For instance, as a new one of resources 5 is added to network 10, administrator 18B may access IMS 14 via UI module 32 to update inventory database 24. Administrator 18B may also use UI module 32 to configure a frequency for network scans performed by network scan module 34. In addition, administrator 18B may use UI module 32 to request IMS 14 to perform an ad hoc inventory scan in addition to scheduled scans. Administrator 18B may use UI module 32 to configure the range of resources 5 in network 10 that network scan module 34 must scan.

Management daemon module 30 manages IMS 14 and the information stored at inventory database 24. Management daemon module 30 may receive the information requested via network scan module 34 from resources 5 of network 10. Based on the information received via network scan module 34, management daemon module 30 may perform write operations to update the data stored at inventory database 24 in order to cause database 24 to reflect the current state of the actively deployed resources of network 10, as being reported by resources 5. In addition, IDBM may receive information from UI module 32 (e.g., as administrator 18B interacts with a CLI of UI module 32) that includes information regarding a change or update to the status of any actively deployed, inactively deployed, and/or dormant resources 5 and/or links 6 and likewise, update the data stored at inventory database 24 to reflect the received information. For example, whether information is received from UI module 32 or network scan module 34, management daemon module 30 may use the received information to update hardware tables, software tables, link tables, licensing tables, etc. in inventory database 24 to reflect the current state of network 10 as determined by the procurement division of the enterprise and/or as reported in response to network scans of resources 5. The data of inventory database 24 may specify both the actively deployed and provisioned resources 5 that communicate on network 10 using paths 7 over links 6, the inactively deployed (e.g., deployed and yet to be provisioned) resources that are capable of communicating on network 10 but not yet provisioned and/or activated for communicating using paths 7, as well as the dormant (e.g., physically located but disconnected resources 5 and links 6 of network 10 that could be turned-on or connected to network 10 to improve traffic flow or create a new or updated path 7).

In addition to receiving information for updating inventory database 24, management daemon module 30 may receive one or more requests from TRMS 12 for at least a portion of the inventory information stored at database 24. For example, TRMS 12 may send an information request via link 8A to topology export module 36 for at least a portion of the information stored at inventory database 24. Responsive to the request received by topology export module 36, management daemon module 30 may send data specified by the request to topology export module 36 and cause topology export module 36 to transmit the requested data from inventory database 24 via link 8A to TRMS 12.

Topology export module 36 may output data from inventory database 24 in accordance with an information protocol, such as the information model for network topologies as defined by the IETF Internet-Draft referenced above, entitled, "Information Model for Network Topologies." In some examples, TRMS 12 may receive information exported by topology export module 36 automatically (e.g., without. TRMS 12 first requesting the information), periodically (e.g., hourly, weekly, daily, etc.) and/or in response to an ad hoc requests generated by TRMS 12 for updated data associated with the physical topology of network 10 from inventory database 24 (e.g., in response to a command from an administrator of TRMS 12 that causes TRMS 12 to request updated information).

TRMS 12 may receive the information exported by topology export module 36 via a network interface connected to link 8A, and use the information to build a topology resource management system, including resource database 22. Resource database 22 stores topology data specifying at least a current role of each of resources 5 within network 10. For example, the information exported by topology export module 36 may indicate whether one of resources 5 is active (e.g., provisioned and/or communicating with network 10), is inactive (e.g., physically deployed but not provisioned and/or not communicating with network 10), or is dormant (e.g., physically deployed but unpowered and explicitly disabled and not set up to be provisioned and communicate on network 10). TRMS may use the information exported by topology export module 36 to make determinations regarding various modifications to resources 5 and/or links 6 to adjust the traffic flow through traffic engineered paths 7 of network 10. For instance, TRMS 12 may determine a modification, such as an adjustment to the current role of at least one of resources 5 within network 10 to modify (e.g., improve) the forwarding of network traffic through network 10 (e.g., activate one of resources 5, provision one of resources 5, deactivate one of resources 5, enable a logical connection over one of links 6 between two active resources 5, etc.). In some examples, the modification may include the addition of or the removal of one of resources 5 to one of the network engineered paths 7.

Figure 3:
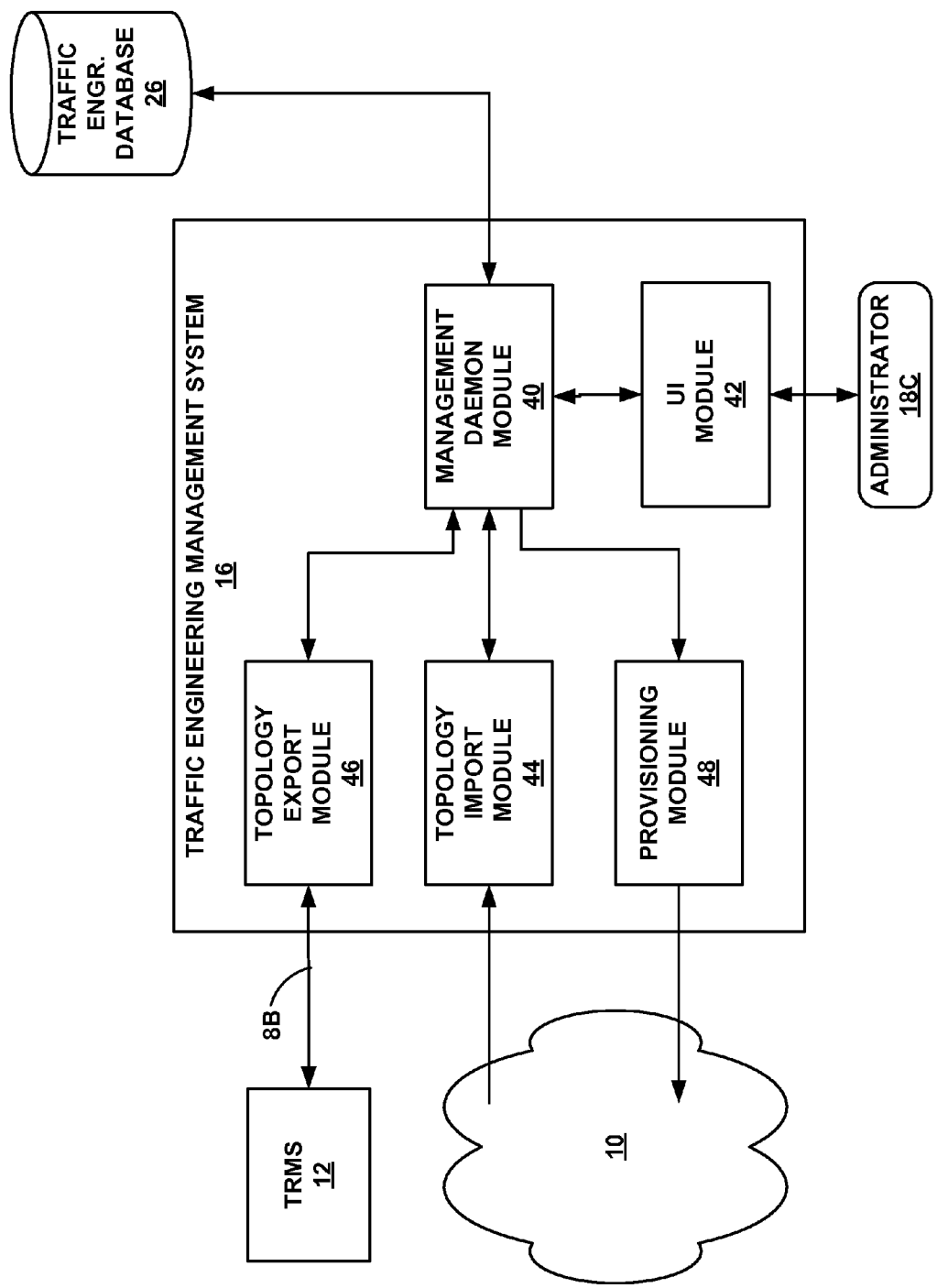
FIG. 3 is a block diagram illustrating components of an example traffic engineering management system that operates in accordance with aspects of this disclosure.

FIG. 3 is a block diagram illustrating components of TEMS 16 that operates in accordance with aspects of this disclosure. FIG. 3 is described below for purposes of example within the context of TEMS 16, TRMS 12, and network 10 of FIG. 1. FIG. 3 illustrates only one particular example of TEMS 16 and many other examples of TEMS 16 may be used in other instances. TEMS 16 may be any general-purpose network or computing device or component thereof, coupled to network 10. TEMS 16 may be for example, a server, laptop computer, workstation, or subcomponent of a server, laptop computer, or workstation.

In the example of FIG. 3, TEMS 16 includes management daemon module 40, UI module 42, topology import module 44, topology export module 46, and provisioning module 48 which are each executing within an operating environment provided by a control unit of TEMS 16. For instance, TEMS 16 may include a control unit that provides the operating environment of TEMS 16 for executing modules 40, 42, 44, 46, and 48.

The term "control unit," as used throughout this disclosure, may refer to any computing element that represents any combination of hardware, software, and/or firmware for implementing the functionality attributed to a network management system, such as TEMS 16, and its constituent modules and elements. When a control unit includes software or firmware, the control unit further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components.

Modules 40, 42, 44, 46, and 48 may perform operations described herein using software, hardware, firmware, or a mixture of hardware, software, and firmware residing in and executing at TEMS 16. For example, a control unit of TEMS 16 may execute modules 40, 42, 44, 46, and 48 as program code with one or more processors. In some examples, TEMS 16 may execute modules 40, 42, 44, 46, and 48 as one or more virtual machines executing on underlying hardware. Modules 40, 42, 44, 46, and 48 may operate independently or collectively to perform a process or service for TEMS 16. FIG. 3 illustrates various communication paths for transmitting data and commands between modules 40, 42, 44, 46, and 48 that facilitate collective operations performed on behalf of TEMS 16. For instance, management daemon module 40 shares a communication path between each of the other modules of TEMS 16.

Topology import module 44 provides an interface by which TEMS 16 receives topology information (e.g., L3 information and up) from actively deployed resources 5 of network 10. Topology import module 44 may, for example, use a software defined networking (SDN) protocol to receive topology information from one or more of resources 5. In some examples, topology import module 44 may receive topology information from resources 5 of network 10. In this example, topology import module 44 receives topology information that includes traffic engineering (TE) information. Topology import module 44 may, for example, execute Intermediate System-to-Intermediate System with TE extensions (IS-IS-TE) or Open Shortest Path First with TE extensions (OSPF-TE) to receive TE information for advertised links. Such TE information may include one or more of the link state, administrative attributes, and metrics such as bandwidth available for use at various LSP priority levels of links connecting routers of the domain. In some instances, topology import module 44 executes Border Gateway Protocol to receive advertised TE information for inter-AS and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," the entire contents of which are incorporated by reference herein. Topology import module 44 may in some instances receive a digest of topology information collected by a topology server, rather than executing a routing protocol to receive routing protocol advertisements directly.

Management daemon module 40 may cause topology import module 44 to request the topology information from resources 5 and perform write operations at traffic engineering database 26 to store the requested topology information received by topology import module 44 as data at traffic engineering database 26 that specifies which of resources 5 are actively deployed within network 10. In addition, management daemon module 40 may store the requested topology information received by topology import module 44 as data at traffic engineering database 26 that specifies traffic engineered paths 7 of network 10 for forwarding network traffic through network 10.

Topology import module 44 may periodically poll resources 5 in network 10 to obtain current topology information about the actively deployed resources 5 in network 10 and the traffic engineered paths 7 of network 10. For example, topology import module 44 may issue a request to each of resources 5 requesting current configuration information. A management daemon module (MGD) or other software agent executing on resources 5 of network 10 may respond by returning the requested topology information. Topology import module 44 may poll resources 5 one at a time, or may scan multiple resources 5 in parallel threads. In another embodiment, topology import module 44 may not poll network 10, but may instead receive event-driven notifications from resources 5 indicating changes in the topology configuration.

UI module 42 presents a user interface (e.g., a command line interface, a graphical user interface, a webpage interface, etc.) by which administrator 18C or other users of the network engineering division of the enterprise interact with TEMS 16. Administrator 18C may, for example, interact with UI module 42 to request, customize, and/or update information stored at traffic engineering database 26 pertaining to the topology of the actively deployed resources 5 of network 10 and the traffic engineered paths 7 that are configured to forward traffic through network 10. For instance, administrator 18C may receive information directly from administrator 18B of the procurement division of the enterprise that the procurement division has recently installed a new one of resources 5 at a particular location and added the new one of resources 5 to network 10.

Administrator 18C may access TEMS 16 via UI module 42 to update traffic engineering database 26 so that TEMS 16 can begin to use the new one of resources 5 in configuring traffic engineered paths 7 through network 10. Administrator 18C may also use UI module 42 to configure a frequency for which topology information polling performed by topology import module 44 may occur. In addition, administrator 18C may use UI module 42 to request TEMS 16 to perform one or more ad hoc topology scans of the actively deployed resources 5 of network 10 in addition to and/or contrary to one or more scheduled scans performed by topology import module 44. Administrator 18C may use UI module 42 to configure the range of resources 5 in network 10 that topology import module 44 scans. For instance, administrator 18C may cause topology import module 44 to only scan a portion of resources 5 of network 10 rather than scan each of resources 5.

Management daemon module 40 manages TEMS 16 and the information stored at traffic engineering database 26. Management daemon module 40 may receive the topology information requested via topology import module 44 from resources 5 of network 10. Based on the topology information received via topology import module 44, management daemon module 40 may perform write operations to update the data stored at traffic engineering database 26 in order to cause database 26 to reflect the current state of the actively deployed and/or provisioned resources 5 of network 10 and the traffic engineered paths 7 of network 10, as being reported by resources 5. In addition, management daemon module 40 may receive information from UI module 42 (e.g., as administrator 18C interacts with a CLI, a GUI, etc. of UI module 42) that includes information regarding a change or update to the status of resources 5 and/or links 6 and likewise, update the data stored at traffic engineering database 26 to reflect the received information. For example, whether information is received from UI module 42 or topology import module 44, management daemon module 40 may use the received information to update the L3 through L7 network topology information stored in traffic engineering database 26 to reflect the current state of network 10 as determined by the network engineering division of the enterprise and/or as reported in response to topology import scans of resources 5. The data stored at traffic engineering database 26 may specify both the actively deployed resources 5 and the traffic engineered paths 7 that use the actively deployed resources 5.

In addition to receiving information for updating traffic engineering database 26, management daemon module 40 may receive one or more requests from TRMS 12 for at least a portion of the traffic engineering information stored at database 26. For example, TRMS 12 may send an information request via link 8B to topology export module 46 for at least a portion of the information stored at traffic engineering database 26. Responsive to the request received by topology export module 46, management daemon module 40 may send data specified by the request to topology export module 46 and cause topology export module 46 to transmit the requested data from traffic engineering database 26 via link 8B to TRMS 12.

In some examples, topology export module 46 may output data from traffic engineering database 26 in accordance with the same information protocol used by topology export module 36 of IMS 14 of FIG. 2. For example, topology export module 46 may output data from traffic engineering database 26 in accordance with the information model for network topologies as defined by the IETF Internet-Draft referenced above, entitled, "Information Model for Network Topologies." In some examples, TRMS 12 may receive information exported by topology export module 46 automatically (e.g., without TRMS 12 first requesting the information from TEMS 16), periodically (e.g., hourly, weekly, daily, etc.) and/or in response to an ad hoc requests generated by TRMS 12 for updated data associated with the traffic engineered/configured topology of network 10 from traffic engineering database 26 (e.g., in response to a command from an administrator of TRMS 12 that causes TRMS 12 to request updated information).

Provisioning module 48 performs traffic engineering operations commanded by management daemon module 40 for configuring resources 5 and links 6 of network 10 for engineering paths 7 that transport network traffic through network 10. For instance, based at least in part on topology information received by topology import module 44, topology information stored at traffic engineering database 26, and/or topology information received from administrator 18B interacting with UI module 42, a path computation module (PCM) of provisioning module 48 may determine one or more paths 7 of network traffic flow through network 10 to satisfy network traffic flow requirements of users of network 10 and/or network services applications executed at resources 5 of network 10. That is, the PCM of provisioning module 48 may process L3 and above topology information and perform path computations and path selections that modifies traffic flow through links 6 and resources 5 of network 10. Based on the path computations and selections, the PCM creates or traffic engineers paths 7 (such as label-switched paths (LSPs)) which improve or at least satisfy the bandwidth, Quality of Service, availability requirements, etc. of resources 5 of network 10 in real-time.

Provisioning module 48 may program forwarding information to data planes of computing resources 5 of network 10. Provisioning module 48 may implement, for instance, a software-defined networking (SDN) protocol such as the OpenFlow protocol or the I2RS protocol to provide and direct computing resources 5 to install forwarding information to their respective data planes. Accordingly, the "FIB" may refer to forwarding tables in the form of, for instance, one or more OpenFlow flow tables each comprising one or more flow table entries that specify handling of matching packets. Provisioning module 48 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. Provisioning module 48 may establish communication sessions with computing resources 5 to install forwarding information to receive path setup event information, such as confirmation that received forwarding information has been successfully installed or that received forwarding information cannot be installed (indicating FIB configuration failure). Provisioning module 48 may add, change (i.e., implicit add), or delete forwarding table entries in accordance with information received from its path computation module.

Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding I2RS are found in "Interface to the Routing System Framework," Network Working Group, Internet-draft, Jul. 30, 2012, which is incorporated by reference as if fully set forth herein. An example SDN protocol for communicating with network devices to establish traffic-engineered paths is described in U.S. application Ser. No. 13/842,453, filed Mar. 15, 2013, entitled "AGGREGATION NETWORK WITH CENTRALIZED CONTROL," the entire contents of which are incorporated by reference herein.

TRMS 12 may receive the information exported by topology export module 46 via a network interface connected to link 8B and use the information to build a topology resource management system, including resource database 22 which stores topology data specifying at least a current role of each of the actively deployed, inactively deployed, and/or dormant resources 5 within network 10. For example, the information exported by topology export module 46 may indicate whether one of resources 5 is actively deployed (e.g., provisioned and/or communicating with network 10), or is inactively deployed (e.g., physically deployed but not provisioned and/or not communicating with network 10) but may not include information indicating any of the dormant (e.g., disabled) resources 5 or links 6 that are conversely specified by IMS 14. TRMS 12 may use the information exported by topology export module 46, combined with the information received from IMS 14, to make determinations regarding various modifications to resources 5 and/or links 6 to adjust the traffic flow through traffic engineered paths 7 of network 10. For instance, TRMS 12 may determine a modification, such as an adjustment to the current role of at least one of resources 5 within network 10 to change the forwarding of network traffic through network 10 (e.g., activate one of resources 5, provision one of resources 5, deactivate one of resources 5, enable a logical connection over one of links 6 between two active resources 5, etc.).

Figure 4:
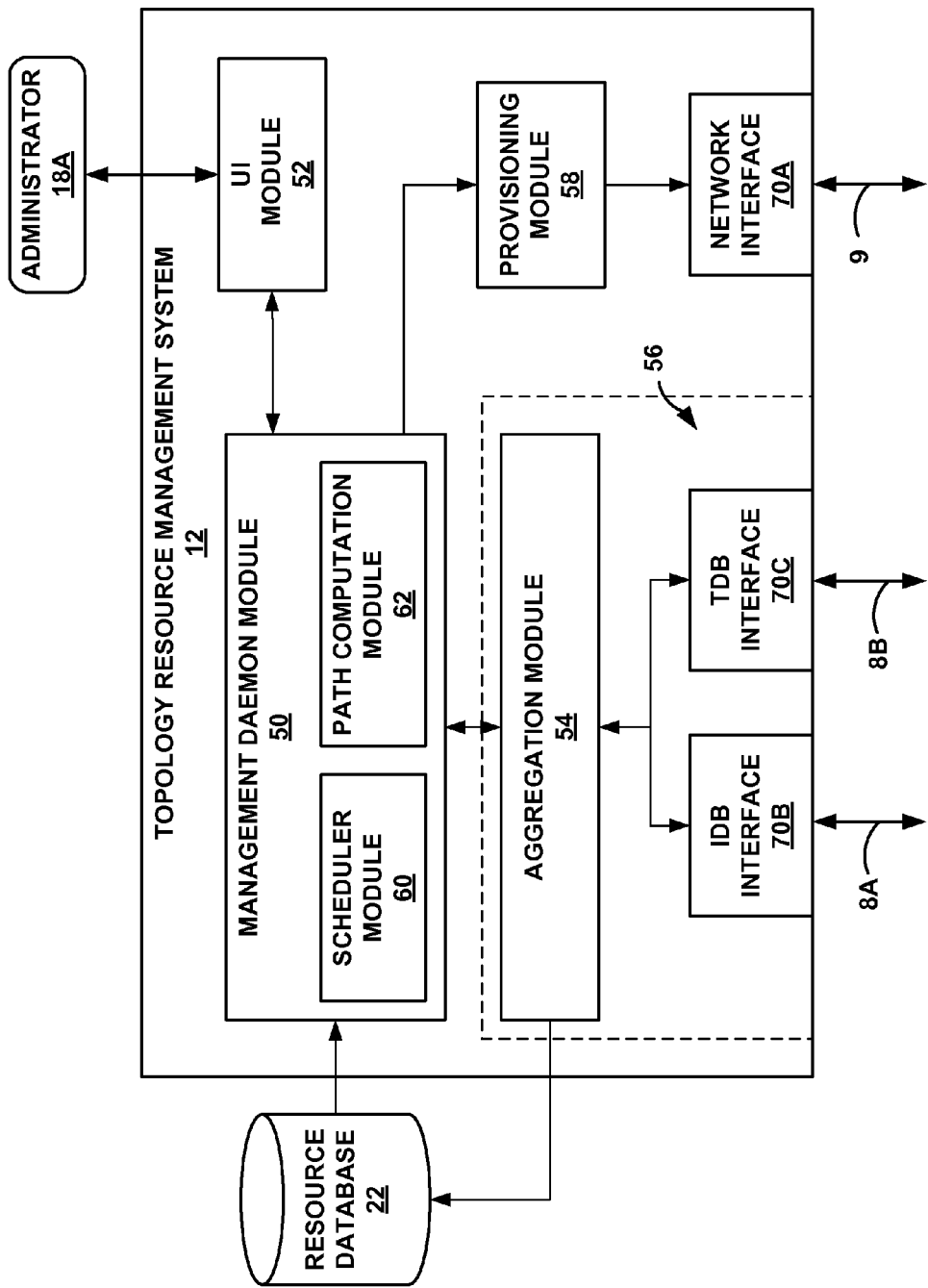
FIG. 4 is a block diagram illustrating components of an example topology resource management system that operates in accordance with aspects of this disclosure.

FIG. 4 is a block diagram illustrating components of TRMS 12 that operates in accordance with aspects of this disclosure. FIG. 4 is described below for purposes of example within the context of TEMS 16, IMS 14, and network 10 of FIG. 1. FIG. 4 illustrates only one particular example of TRMS 12 and many other examples of TRMS 12 may be used in other instances. TRMS 12 may be any general-purpose network device, computing device, or component thereof, coupled to network 10. For instance, TRMS 12 may include one or more servers, laptop computers, workstations, or sub-component of a server, laptop computer, or workstation. In some examples, TRMS 12 may be a software-defined network (SDN) controller.

In the example of FIG. 4, TRMS 12 contains management daemon module 50, UI module 52, aggregation module 54, and provisioning module 58 which are each executing within an operating environment provided by TRMS 12. Management daemon module 50 further includes scheduler module 60 and path computation module 62 that each represent sub-components of portions of management daemon module 50 which are executing within the operating environment provided by TRMS 12. For instance, TRMS 12 may include a control unit that provides the operating environment of TRMS 12 for executing modules 50, 52, 54, 58, 60, and 62.

Modules 50, 52, 54, 58, 60, and 62 may perform operations described herein using software, hardware, firmware, or a mixture of hardware, software, and firmware residing in and executing at TRMS 12. For example, a control unit of TRMS 12 may execute modules 50, 52, 54, 58, 60, and 62 as program code with one or more processors. In some examples, TRMS 12 may execute modules 50, 52, 54, 58, 60, and 62 as one or more virtual machines executing on underlying hardware. Modules 50, 52, 54, 58, 60, and 62 may operate independently or collectively to perform a process or service for TRMS 12. FIG. 4 illustrates various communication paths for transmitting data and commands between modules 50, 52, 54, 58, 60, and 62 that facilitate collective operations performed on behalf of TRMS 12. For instance, management daemon module 50 shares a communication path between each of the other modules of TRMS 12.

TRMS 12 further includes interfaces 70A, 70B, and 70C (collectively "interfaces 7") for transmitting and/or receiving information between TRMS 12 and resources 5 of network 10, IMS 14, and TEMS 16. For example, as described in greater detail below, TRMS 12 may transmit and receive information at network interface 70A, via link 9, to and from one or more of resources 5 of network 10. In addition, TRMS 12 may receive physical topology information associated with network 10 at inventory database (IDB) interface 70B, via link 8A, from IMS 14. Additionally, TRMS 12 may receive network engineering topology information associated with actively deployed resources 5 and paths 7 of network 10, via link 8B, from TEMS 16 at traffic engineering database (TDB) interface 70C. TRMS 12 may transmit requests for information to IMS 14 and TEMS 16 at interfaces 70B and 70C respectively.

UI module 52 presents a user interface (e.g., a command line interface, a graphical user interface, a webpage interface, etc.) by which administrator 18A or other user associated with TRMS 12 interacts with TRMS 12 and the data stored at resource database 22. Administrator 18A may, for example, interact with UI module 52 to request, customize, and/or update information stored at resource database 22 pertaining to the network topology of the actively deployed and/or provisioned resources 5 of network 10, the traffic engineered paths 7 that are configured to forward traffic through network 10, the inactive, yet-to-be deployed, and/or yet-to-be provisioned resources 5 of network 10 that if activated and/or provisioned, could be configured to form at least a portion of a traffic engineered path 7 to forward traffic through network 10, as well as the dormant (e.g., physically disabled or disconnected) resources 5 and links 6 that could be configured and enabled to form at least a portion of a traffic engineered path 7 to forward traffic through network 10. For instance, administrator 18A may input a command at a CLI of UI module 52 to manually cause TRMS 12 to refresh the data stored at resource database 22 and/or execute a network path optimization algorithm for recalculating an existing path 7 or creating a new path 7 through network 10. In response to the CLI command from administrator 18A, management daemon module 50 of TRMS 12 may cause aggregation module 54 to transmit a request via interfaces 70B and 70C for updated topology data from IMS 14 and TEMS 16.

Administrator 18A may use UI module 52 to configure scheduler module 60 which represents a subcomponent of management daemon module 50 for controlling the frequency for which management daemon module 50 causes aggregation module 54 to request topology information from IMS 14 and TEMS 16. For instance, administrator 18A may configure scheduler module 60 to generate an interrupt to cause management daemon module 50 to induce aggregation module 54 to perform one or more hourly, weekly, daily, monthly, etc. periodic topology information imports of the data stored at databases 24 and 26 that specifies both the actively deployed, the inactively deployed, the dormant yet available resources 5 of network 10, as well as the traffic engineered paths 7 of network 10. In addition administrator 18A may interact with UI module 52 to cause management daemon module 50 to induce an ad hoc request by aggregation module 54 for updated topology information from TEMS 16 and IMS 14.

Provisioning module 58 performs traffic engineering operations commanded by management daemon module 50 for configuring resources 5 and links 6 of network 10 for engineering paths 7 that transport network traffic through network 10. For instance, based at least in part on topology information stored at resource database 22, provisioning module 50 can configure one or more of resources 5 to produce one of paths 7 of network traffic flow through network 10 to satisfy network traffic flow requirements of users of network 10 and/or network services applications executing at resources 5 of network 10. That is, provisioning module 58 may configure L3 and above topology information of resources 5 to implement path computations and path selections determined by management daemon module 50 to change and in some instances improve the traffic flow through links 6 and resources 5 of network 10.

Aggregation module 54 may aggregate information received at interfaces 70B and 70C of TRMS 12 and cause TRMS 12 to build, from the aggregated information, one or more accurate, and up-to-date, hierarchical topology data structures for each of resources 5, and store the hierarchical topology data structures as topology data at resource database 22. An abstract view of the aggregated information and each of these hierarchical topology data structures is described below in greater detail with respect to FIG. 5. In this way, the data stored at resource database 22 specifies at least a current role of each of resources 5 (whether actively deployed, inactively deployed and standing by for future provisioning, or dormant and standing by for future activation) within network 10.

In some examples, aggregation module 54 of TRMS 12 may aggregate the received information by at least resolving one or more discrepancies between a portion of the topology data from IMS 14 with a portion of the topology data from TEMS 16. For example, aggregation module 54 may reconcile discrepancies that may exist between the topology data specified at physical inventory database 24 and the topology data specified at traffic engineering database 26 to produce topology data stored at resource database 22. The topology data produced for, and stored at resource database 22 may specify a complete and accurate picture or view of the current state and topology (e.g., both physical and logical) of network 10 and the interaction of resources 5 within network 10 in forming network engineered paths 7.

For example, aggregation module 54 may combine or "overlay" L1 and L2 network topology information associated with each of the active, inactive, and dormant resources 5 and links 6 of network 10 that TRMS 12 receives from IMS 14, with the network engineered L3 through L7 network topology information associated with the deployed resources 5 of network 10 (e.g., the data from TEMS 16). In other words, aggregation module 54 may combine or "overlay" the higher layered information from database 26 with lower layered information from database 24 to produce a single dataset at database 22 specifying the hierarchical structure of each of resources 5 of network 10 and their interaction with each of the layers of network 10.

Aggregation module 54 may resolve inconsistencies that may exist between the imported data. For instance, aggregation module 54 may resolve inconsistencies by relying on topology data from one database that has a more recent timestamp rather than other topology data from another database that has an older or less recent timestamp.

Aggregation module 54 may communicate with a plurality of network management systems of network 10, including IMS 14 and TEMS 16, in accordance with an information protocol, such as the information model for network topologies as defined by the IETF Internet-Draft referenced above, entitled, "Information Model for Network Topologies." In some examples, Aggregation module 54 of TRMS 12 may receive topology data from IMS 14 and TEMS 16 automatically (e.g., without requiring aggregation module 54 to first request the information), periodically (e.g., hourly, weekly, daily, etc. as controlled by scheduler module 60) and/or in response to a periodic and/or ad hoc request generated by aggregation module 54 to cause IMS 14 and TEMS 16 to transmit (e.g., export) network topology data stored at each of the respective databases 24 and 26.

Management daemon module 50 may rely on topology data that aggregation module 54 stores at resource database 22 to perform network engineering and path optimization operations using path computation module 62 to determine paths 7 to improve traffic flow through network 10 and/or to address network requirements of users and/or network service applications of network 10. Path computation module 62 may transmit instructions or commands to provisioning module 58 to cause provisioning module 58 to configure resources 5 to implement the network engineering and path optimizations of network 10 determined by path computation module 62.

For example, path computation module 62 may determine, based at least in part on the information stored at resource database 22, one or more inactively deployed resources 5 or links 6 of network 10 or dormant one or resources 5 or links 6 of network 10 that, if actively deployed within network 10, could be provisioned and/or configured to form part of one of network engineering paths 7 to forward traffic through network 10. With access to a more complete picture or view of the available resources 5 of network 10 using the topology data of resource database 22, path computation module 62 can generate improved network engineered paths 7 for forwarding network traffic through network 10 over other network engineered paths 7 that are generated by other traffic engineering management systems (e.g., TEMS 16) that rely only on topology data that specifies deployed resources of a network and not also the dormant resources.

In other words, aggregation module 54 of TRMS 12 can reconcile data maintained by IMS 14 from a procurement division of an enterprise with data maintained by TEMS 16 from a network engineering division of the enterprise for the benefit of path computation module 62 so that path computation module 62 can better network engineer and provision resources 5 and paths 7 of network 10. Path computation module 26 can use the aggregated data stored at resource database 22 to perform network engineering of network 10 with a "centralized" view of the topology of network 10. The aggregated data stored at resource database 22 can be used by path computation module 26 in executing path engineering algorithms (e.g., dijkstra, etc.) to determine the best, worst, and intermediate, network engineered paths 7 of network 10 and also determine the complete network engineering capabilities of resources 5. For example, the aggregated data of resource database 22 can be used by path computation module 26 to determine the time latency associated with various new and existing paths 7 (e.g., the shipping around of network state as is done in distributed protocols), as well as to cause the protocols executing at each of paths 7 to compute "relatively local improvements" (e.g., shortest path segments, etc.) within entire paths 7 and/or segments or portions of paths 7.

TRMS 12 may receive, at an interface, information from a plurality of separate database systems. The plurality of separate database systems may include a physical network inventory system and a traffic engineering system. The physical network inventory system may store first topology data specifying resources within a network and the traffic engineering system may store second topology data specifying the resources that are actively deployed within the network and data specifying traffic engineered paths configured to forward network traffic through the network. For example, scheduler module 60 of management daemon module 50 of TRMS 12 may cause aggregation module 54 to periodically request physical topology data from IMS 14 stored at inventory database 24 and traffic engineering topology data from TEMS 16 stored at traffic engineering database 26. Aggregation module 54 may receive the physical network topology data at IDB interface 70B and receive the traffic engineering topology data at TDB interface 70C.

TRMS may aggregate the received information into a topology resource management system. The topology resource management system may store third topology data specifying at least a current role of each of the resources within the network. For example, aggregation module 54 may compile the data received from each of the two management systems IMS 14 and TEMS 16 into a single set of topology data stored at resource database 22. Resource database 22 may include information about each of the actively deployed resources 5 of network 10, the deployed resources 5, as well as the yet to be deployed or dormant resources 5 of network 10, that may be included within inventory database 24 but may not be included in traffic engineering database 26.

TRMS 12 may determine a modification to at least one of the traffic engineered paths based on the third topology data. The modification may include an adjustment to the current role of at least one of the resources within the network to change, modify, and in some instances, improve or load balance the forwarding of the network traffic through the network. For example, path computation module 62 of management daemon module 50 may perform one or more traffic engineering path computation algorithms to improve or update paths 7 through network 10 based on updated information stored at resource database 22. Path computation module 62 may determine an improvement to one of paths 7, for instance, by identifying one of the inactively deployed or dormant and yet to be deployed resources 5 of network 10 that the procurement division of the enterprise recently purchased and installed at a physical location of network 10 as being one of resources 5 that if enabled, and actively deployed and provisioned, would improve traffic flow through one of paths 7 of network 10.

In some examples, the modification to the at least one of the traffic engineered paths 7 based on the topology data stored at resource database 22 comprises an addition of the at least one of the resources 5 within the network 10 to the at least one of the traffic engineered paths 7 to change the forwarding of the network traffic through network 10. In some examples, the modification to the at least one of the traffic engineered paths 7 based on the topology data stored at resource database 22 comprises the removal of the at least one of the resources 5 within network 10 from the at least one of the traffic engineered paths 7 to change the forwarding of the network traffic through network 10.

TRMS 12 may output, at the interface, for transmission to the at least one of resources within the network, provisioning information for adjusting the current role of the at least one of the resources based on the modification. For example, path computation module 62 may transmit a command or instructions to provisioning module 58 that cause provisioning module 58 to communicate via network interface 70A with the identified one of resources 5 to provision the identified resource 5, and adjust the role of the identified resource from being inactive or dormant to being actively deployed and part of one of network engineering paths 7.

In some examples, TRMS 12 may determine the modification to the at least one of the traffic engineered paths based on the current role of at least one of the resources that is specified in the first topology data and is not specified in the second topology data or that is specified in the second topology data and is not specified in the first topology data. In other words, path computation module 62 may determine a modification to one of paths 7 of network 10 based on one of resources 5 that is specified by the topology data of inventory database 24, but not specified by the topology data of traffic engineering database 26. For instance, the procurement division may store L1 topology data associated with an inactive and un-provisioned or dormant one of resources 5 added to network 10. Without informing the network engineering division of the newly added one of resources 5, and since traffic engineering database 26 may not specify physical network topology data (e.g., L1 data), traffic engineering database 26 may not include information indicating the existence of the newly added one of resources 5.

In some examples, TRMS 12 may determine the modification to the at least one of the traffic engineered paths based on the current role of the at least one of the resources specified in the first topology data as being an inactive or dormant resource of the network. In other words, path computation module 62 may determine a modification to one of paths 7 that includes activating a previously deployed, but inactive, dormant, and/or un-provisioned, one of resources 5 to improve traffic flow through that one of paths 7.

In some examples, the provisioning information that TRMS 12 outputs for adjusting the current role of the at least one of the resources based on the modification includes provisioning information for activating the at least one of the resources to allow the network traffic to be forwarded through the at least one of the traffic engineered paths using the at least one of the resources. In other words, responsive to management daemon module transmitting a command or instruction to provisioning module 58 to activate one of inactive or dormant resources 5 of network 10 to modify or change one of paths 7, provisioning module 58 may output configuration information via network interface 70A that causes the role of the inactive or dormant one of resources 5 to change from inactive or dormant, to actively deployed.

In some examples, the provisioning information that TRMS 12 outputs for adjusting the current role of the at least one of the resources based on the modification includes provisioning information for de-activating the at least one of the resources to prevent the network traffic from being forwarded through the at least one of the traffic engineered paths using the at least one of the resources. In other words, in some instances, path computation module 62 may determine that one or resources 5 should be deactivated to improve traffic flow through network 10 and/or satisfy various other requirements of a user of network 10 and/or a network application. Responsive to management daemon module transmitting a command or instruction to provisioning module 58 to deactivate one of an actively deployed one of resources 5 of network 10, provisioning module 58 may output configuration information via network interface 70A that causes the role of the actively deployed one of resources 5 to change from actively deployed, to inactively deployed or dormant.

Figure 5:
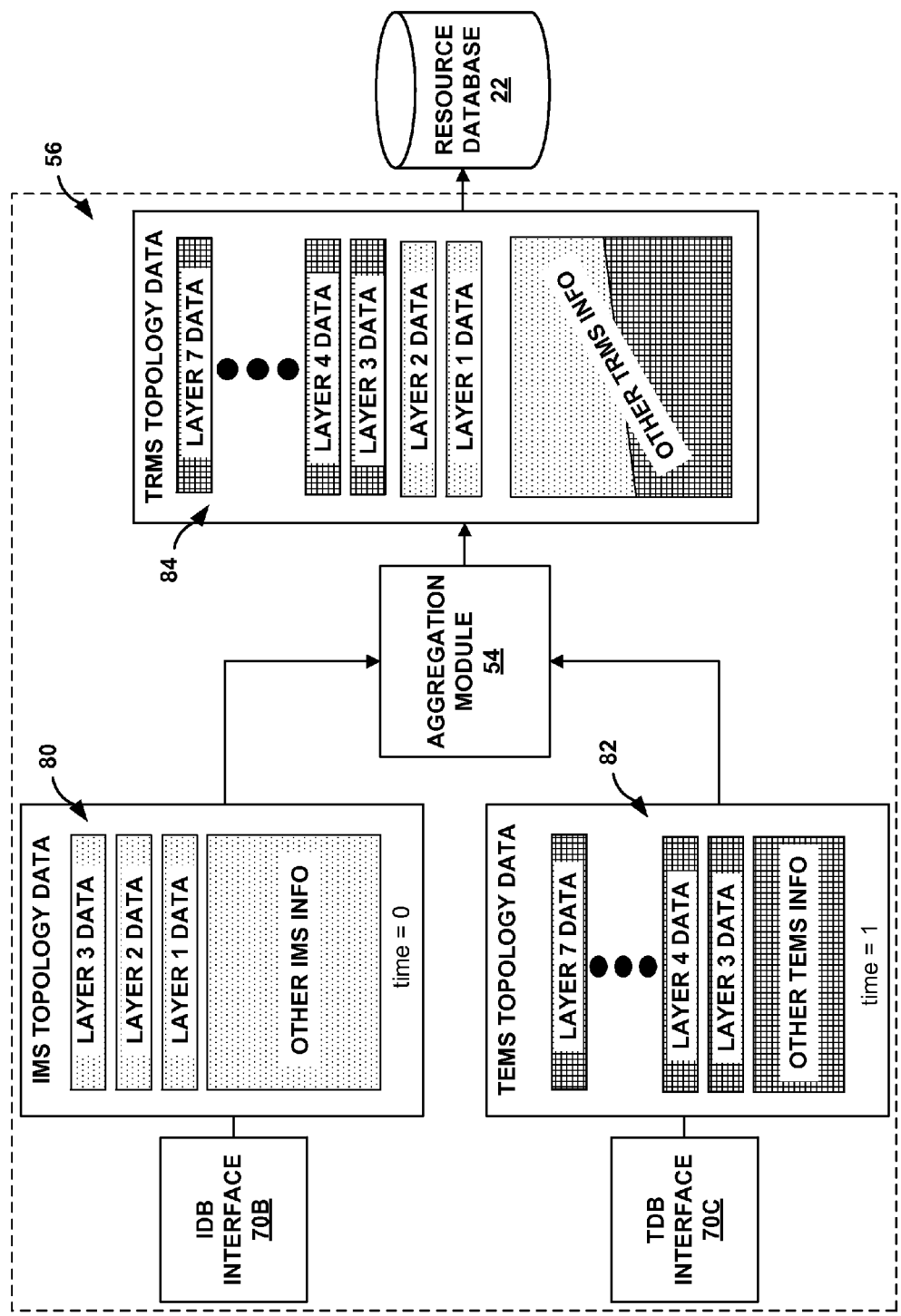
FIG. 5 is a block diagram illustrating a detailed view of a portion of the example topology resource management system of FIG. 4 and a conceptual diagram of aggregated topology data produced by the example topology resource management system, using the techniques of this disclosure.

FIG. 5 is a block diagram illustrating a detailed view of portion 56 of TRMS 12 of FIG. 4 and a conceptual diagram of aggregated topology data produced by TRMS 12, using the techniques of this disclosure. FIG. 5 is described below for purposes of example within the context of network 10 of FIG. 1. For example, FIG. 5 illustrate conceptual data structures 80, 82, and 84 that are each associated with a single one of resources 5 of network 10.

Data structure 80 includes inventory management system (IMS) topology data specified by inventory database 24, such as L1, L2, L3 topology data, as well as other inventory management system information, such as information about the current role of the associated one of resources 5 (e.g., whether or not the associated one of resources 5 is actively deployed, inactively deployed and "standing by" for future provisioning, or dormant (e.g., standing by for future enablement and network expansion). Data structure 80 may have a time stamp of time zero associated with the information of the associated one of resources 5.

Data structure 82 includes traffic engineering management system (TEMS) topology data specified by traffic engineering database 26, such as L3 through L7 topology data, as well as other traffic engineering management system information, such as information indicating the one or more paths 7 that the associated one of resources 5 is associated with. Data structure 82 may have a time stamp of time one (e.g., a more recent time stamp than the data of data structure 80).

FIG. 5 illustrates IMS topology data being received by aggregation module 54 at IDB interface 70B of TRMS 12 and TEMS topology data being received by aggregation module 54 at TDB interface 70C. Aggregation module 54 of TRMS 12 may aggregate the received information into traffic resource management system (TRMS) topology data, as illustrated by data structure 84. For example, aggregation module 54 may combine (e.g., overlay, stack, merge) a portion of the IMS topology data with a portion of the TEMS topology data. Both the portion of the IMS topology data and the portion of the TEMS topology data are associated with the same one of resources 5 of network 10. The portion of the IMS topology data is associated with at least a first network layer of the network (e.g., L1 and L2) and the portion of the TEMS topology data is associated with at least a second network layer of the network (e.g., L3 through L7) that is different from the first network layer of the network. In other words, aggregation module 54 may extract a portion of the topology data received from IMS 14, for instance, the physical network topology information, and combine the extracted portion of the topology data received from IMS 14 with a portion of the topology data received from TEMS 16.

FIG. 5 further illustrates that aggregation module 54 may store the combined or overlaid portions of the IMS and TEMS topology data as a portion of the TRMS topology data associated with the same one of resources 5 of network 10. By reconciling the information within the two databases 14 and 16, resource database 22 specifies a more complete, accurate, and at times, more current picture of each of the available resources 5 of network 10 for performing network engineering path optimization operations. In other words, TRMS 12 can cause path computation module 62 of TRMS 12 to execute path optimization algorithms on network 10 to improve traffic flow through network 10 by performing "what-if" scenarios of potential network engineered paths 7 that use not just the actively deployed resources 5 of network 10, but also the inactive deployed resources, as well as the dormant and yet to be deployed resources 5 of network 10 that are indicated in IMS 14 but not indicated in TEMS 16.

The TRMS topology data stored as data structure 84 may be used by TRMS 12 (e.g., path computation module 26) to perform network engineering of network 10 with a "centralized" view of the topology of network 10. The TRMS topology data stored as data structure 84 may be used in executing path engineering algorithms (e.g., dijkstra, etc.) to determine the best, worst, and intermediate, network engineered paths 7 of network 10 and also determine the complete network engineering capabilities of resources 5. For example, the TRMS topology data stored as data structure 84 may be used by TRMS 12 to determine the time latency associated with various new and existing paths 7 (e.g., the shipping around of network state as is done in distributed protocols), as well as to cause the protocols executing at each of paths 7 to compute "relatively local improvements" (e.g., shortest path segments, etc.) within entire paths 7 and/or segments or portions of paths 7.

Figure 6:
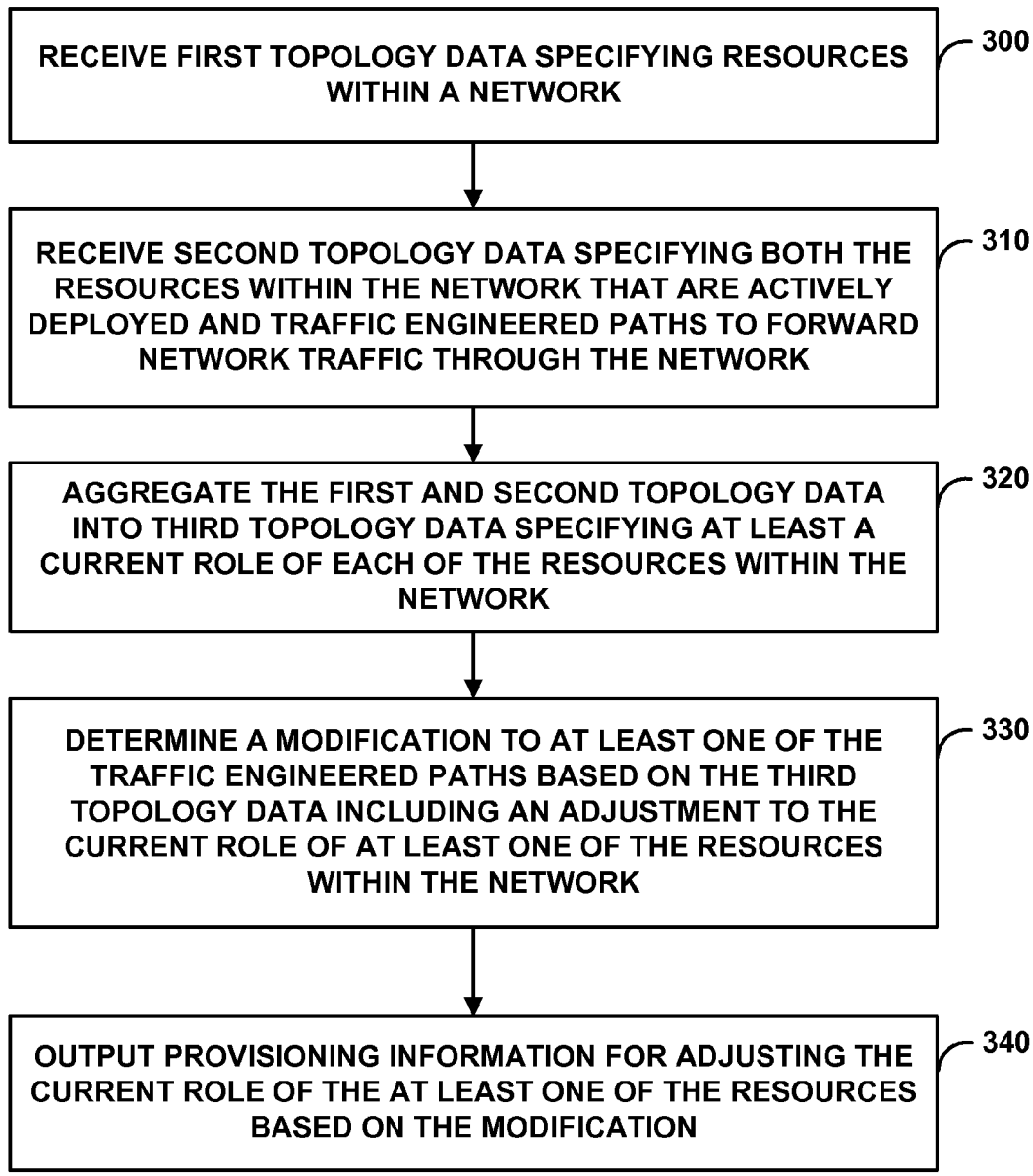
FIG. 6 is a flowchart illustrating example operations of an example topology resource management system, using the techniques of this disclosure.

FIG. 6 is a flowchart illustrating example operations of TRMS 12, using the techniques of this disclosure. The process of FIG. 6 may be performed by TRMS 12 illustrated in FIG. 1 and FIG. 4, for example. For purposes of illustration only, FIG. 5 is described below within the context of network 10 and TRMS 12 of FIG. 1 and FIG. 2.

In the example of FIG. 6, TRMS 12 may receive first topology data specifying resources within a network (300). For example, aggregation module 54 may request information stored at inventory database 24 from IMS 14 that specifies the physical network topology of network 10, such as information that indicates each of the available (e.g., both actively deployed, inactively deployed, or dormant) resources 5 and links 6 of network 10.

TRMS 12 may receive second topology data specifying both the resources with the network that are deployed (e.g., actively deployed and inactively deployed) and traffic engineered paths to forward network traffic through the network (310). For example, aggregation module 54 may request information stored at inventory database 24 from IMS 14 that specifies the deployed resources 5 of network 10 and the one or more engineered paths 7 of network 10 to forward network traffic through network 10.

TRMS 12 may aggregate the first and second topology data into third topology data specifying at least a current role of each of the resources with the network (320). For example, aggregation module 54 may reconcile the data received at interfaces 70B and 70C into a unified and consistent hierarchal format that specifies a complete topology picture of network 10 and the current role or potential role of each of the active, inactive, and dormant resources 5 of network 10. Aggregation module 54 may create an entry of each of the active, inactive, and dormant resources 5 of network 10 within resources database 22 that includes at least a portion of the information from each of IMS 14 and TEMS 16.

TRMS 12 may determine a modification to at least one of the traffic engineered paths based on the third topology data including an adjustment to the current role of at least one of the resources within the network (330). For example, management daemon module 50 may periodically and automatically cause path computation module 62 to execute path optimization algorithms of network 10 and/or perform "what if" computations of network traffic flow through network 10 utilizing the topology data of resource database 22. The path optimization algorithms executed by path computation module 62 can determine more optimal paths 7 through network 10 by considering activating and deactivating one or more of resources 5. Unlike some other path optimization systems, path computation module 62 can change the network traffic flow by not only utilizing the deployed resources 5 of network 10 specified by traffic engineering database 16, but also the dormant (e.g., explicitly disabled resources 5 and links 6 of network 10) specified by topology data of inventory database 14.

TRMS 12 may output provisioning information for adjusting the current role of the at least one of the resources based on the modification (340). For example, after determining whether or not to activate and/or deactivate one or more of resources 5 of network 10, management daemon module 50 may send a command or instructions to provisioning module 58 of TRMS 12 to reconfigure and activate/provision or deactivate the one or more resources 5 identified by path computation module 62. Provisioning module 58 may cause TRMS 12 to output provisioning instructions via network interface 70A that cause the one or more identified resources 5 to become activated or deactivated in accordance with the determination made by path computation module 62.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   receiving, at a network device and from a physical network inventory system that stores first topology data specifying resources and links within a network, the first topology data;
   receiving, at the network device and from a traffic engineering system that stores second topology data specifying each of the resources and links that are deployed within the network and data specifying traffic engineered paths configured to forward network traffic through the network, the second topology data;
   aggregating, by the network device, the first topology data and the second topology data into a topology resource management system, wherein the topology resource management system stores the aggregated first topology data and second topology data as third topology data specifying at least a current role of each of the resources and links within the network;
   determining, by the network device, a modification to at least one of the traffic engineered paths based on the third topology data, wherein the modification includes an adjustment to the current role of at least one of the resources and links within the network to change the forwarding of the network traffic through the network; and
   outputting, by the network device, for transmission to the at least one of the resources within the network, provisioning information for adjusting the current role of the at least one of the resources and links within the network based on the modification,
   wherein each of the physical network inventory system, the traffic engineering system, and the topology resource management system comprises a separate database system.

2. The method of claim 1, wherein determining the modification to the at least one of the traffic engineered paths comprises determining the modification based on a current role of at least one of the resources and links that is specified as a dormant resource of the network that is physically disabled and disconnected from the network in the first topology data specifying the resources and links within a network and is not specified as a dormant resource of the network that is physically disabled and disconnected from the network in the second topology data specifying the resources and links that are deployed within the network.

3. The method of claim 1, wherein determining the modification to the at least one of the traffic engineered paths comprises determining the modification based on a current role of at least one of the resources and links that is specified as an inactively deployed resource of the network in the second topology data specifying the resources and links that are deployed within the network and is not specified as an inactively deployed resource of the network in the first topology data specifying the resources and links within the network.

4. The method of claim 1, wherein determining the modification to the at least one of the traffic engineered paths comprises determining the modification based on a current role of the at least one of the resources and links specified in the first topology data as being a dormant resource of the network.

5. The method of claim 1, wherein determining the modification to the at least one of the traffic engineered paths comprises determining the modification based on a current role of the at least one of the resources and links specified in the first topology data and the second topology data as being an actively deployed or inactively deployed resource of the network.

6. The method of claim 1, wherein the modification to the at least one of the traffic engineered paths based on the third topology data comprises an addition of the at least one of the resources and links within the network to the at least one of the traffic engineered paths to change the forwarding of the network traffic through the network.

7. The method of claim 1, wherein the modification to the at least one of the traffic engineered paths based on the third topology data comprises the removal of the at least one of the resources and links within the network from the at least one of the traffic engineered paths to change the forwarding of the network traffic through the network.

8. The method of claim 1, wherein the provisioning information for adjusting the current role of the at least one of the resources based on the modification comprises provisioning information for activating the at least one of the resources and links to allow the network traffic to be forwarded through the at least one of the traffic engineered paths using the at least one of the resources and links.

9. The method of claim 1, wherein the provisioning information for adjusting the current role of the at least one of the resources and links based on the modification comprises provisioning information for de-activating the at least one of the resources and links to prevent the network traffic from being forwarded through the at least one of the traffic engineered paths using the at least one of the resources and links.

10. The method of claim 1, wherein aggregating the received first topology data and the received second topology data into the topology resource management system further comprises resolving, by the network device, one or more discrepancies between a portion of the received first topology data with a portion of the received second topology data.

11. The method of claim 1, wherein the resources within the network comprises a first resource, and wherein aggregating the received first topology data and the received second topology data into the topology resource management system further comprises:
    combining, by the network device, a portion of the received first topology data with a portion of the received second topology data, wherein both the portion of the received first topology data and the portion of the received second topology data are associated with the first resource, and wherein the portion of the received first topology data is associated with at least a first network layer of the network and the portion of the received second topology data is associated with at least a second network layer of the network that is different from the first network layer of the network; and
    storing, by the network device, the combined portions of the received first topology data and the received second topology data as a portion of the third topology data associated with the first resource.

12. The method of claim 1, wherein the provisioning information for adjusting the current role of the at least one of the resources and links within the network further comprises provisioning information for adjusting the current role of the at least one of the resources and links within the network from a dormant resource that is physically disabled and disconnected from the network to an actively deployed resource.

13. A device comprising:
    an interface configured to:
        receive, from a physical network inventory system that stores first topology data specifying resources and links within a network, the first topology data, the first topology data; and
        receive, from a traffic engineering system that stores second topology data specifying each of the resources and links that are deployed within the network and data specifying traffic engineered paths configured to forward network traffic through the network, the second topology data;
    a memory comprising:
        third topology data specifying at least a current role of each of the resources and links within the network, the third topology data stored in a topology resource management system; and
    a control unit comprising:
        an aggregation module configured to aggregate the first topology data and second topology data into the third topology data, wherein each of the physical network inventory system, the traffic engineering system, and the topology resource management system comprises a separate database system,
        a management daemon module configured to determine a modification to at least one of the traffic engineered paths based on the third topology data, wherein the modification includes an adjustment to a current role of at least one of the resources and links within the network to change the forwarding of the network traffic through the network, and
        a provisioning module configured to generate provisioning information for adjusting the current role of the at least one of the resources based on the modification determined by the management daemon module, wherein the interface is configured to output the provisioning information for adjusting the current roles of the at least one of the resources within the network.

14. The device of claim 13, wherein the management daemon module is configured to determine the modification to the at least one of the traffic engineered paths based on the current role of at least one of the resources and links that is specified as a dormant resource of the network in the first topology data and is not specified as a dormant resource of the network in the second topology data.

15. The device of claim 13, wherein the management daemon module is configured to determine the modification to the at least one of the traffic engineered paths based on the current role of at least one of the resources and links that is specified as an inactively deployed resource of the network in the second topology data and is not specified as an inactively deployed resource of the network in the first topology data.

16. The device of claim 13, wherein the management daemon module is configured to determine the modification to the at least one of the traffic engineered paths based on the current role of the at least one of the resources and links specified in the first topology data as being an inactive resource of the network.

17. The device of claim 13, wherein the modification to the at least one of the traffic engineered paths based on the third topology data comprises the addition of the at least one of the resources and links within the network to the at least one of the traffic engineered paths to change the forwarding of the network traffic through the network.

18. The device of claim 13, wherein the modification to the at least one of the traffic engineered paths based on the third topology data comprises the removal the at least one of the resources and links within the network from the at least one of the traffic engineered paths to change the forwarding of the network traffic through the network.

19. The device of claim 13, wherein the provisioning information for adjusting the current roles of the resources within the network includes provisioning information for activating the at least one of the resources and links to allow the network traffic to be forwarded through the at least one of the traffic engineered paths using the at least one of the resources and links.

20. The device of claim 13, wherein the provisioning information for adjusting the current roles of the resources and links within the network includes provisioning information for de-activating the at least one of the resources and links to prevent the network traffic from being forwarded through the at least one of the traffic engineered paths using the at least one of the resources and links.

21. A non-transitory computer-readable storage medium comprising instructions that, when executed, cause a processor to:

receive, at a network device and from a physical network inventory system that stores first topology data specifying resources and links within a network, the first topology data;

receive, at the network device and from a traffic engineering system that stores second topology data specifying each of the resources and links that are deployed within the network and data specifying traffic engineered paths configured to forward network traffic through the network, the second topology data;

aggregate the first topology data and second topology data into a topology resource management system, wherein the topology resource management system stores the aggregated first topology data and the second topology data as third topology data specifying at least a current role of each of the resources and links within the network;

determine a modification to at least one of the traffic engineered paths based on the third topology data, wherein the modification includes an adjustment to a current role of at least one of the resources and links within the network to change the forwarding of the network traffic through the network; and output, for transmission to the at least one of resources within the network, provisioning information for adjusting the current role of the at least one of the resources based on the modification, wherein each of the physical network inventory system, the traffic engineering system, and the topology resource management system comprises a separate database system.

* * * * *